A. G. BELL, F. W. BALDWIN, J. A. D. McCURDY, G. H. CURTISS & T. E. SELFRIDGE.
E. A. SELFRIDGE, ADMINISTRATOR OF T. E. SELFRIDGE, DEC'D.
FLYING MACHINE.
APPLICATION FILED APR. 8, 1909.

1,011,106.

Patented Dec. 5, 1911.

A. G. BELL, F. W. BALDWIN, J. A. D. McCURDY, G. H. CURTISS & T. E. SELFRIDGE.
E. A. SELFRIDGE, ADMINISTRATOR OF T. E. SELFRIDGE, DEC'D.
FLYING MACHINE.
APPLICATION FILED APR. 8, 1909.

1,011,106.

Patented Dec. 5, 1911.
5 SHEETS—SHEET 2.

A. G. BELL, F. W. BALDWIN, J. A. D. McCURDY, G. H. CURTISS & T. E. SELFRIDGE.
E. A. SELFRIDGE, ADMINISTRATOR OF T. E. SELFRIDGE, DEC'D.
FLYING MACHINE.
APPLICATION FILED APR. 3, 1909

1,011,106.

Patented Dec. 5, 1911.
5 SHEETS—SHEET 5

UNITED STATES PATENT OFFICE.

ALEXANDER GRAHAM BELL, OF WASHINGTON, DISTRICT OF COLUMBIA, FREDERICK W. BALDWIN, OF TORONTO, ONTARIO, JOHN A. DOUGLAS McCURDY, OF BADDECK, NOVA SCOTIA, CANADA, GLENN H. CURTISS, OF HAMMONDSPORT, NEW YORK, AND EDWARD A. SELFRIDGE, OF SAN FRANCISCO, CALIFORNIA, ADMINISTRATOR OF THOMAS E. SELFRIDGE, DECEASED, ASSIGNORS TO CHARLES J. BELL, TRUSTEE, OF WASHINGTON, DISTRICT OF COLUMBIA.

FLYING-MACHINE.

1,011,106.      Specification of Letters Patent.     Patented Dec. 5, 1911.

Application filed April 8, 1909. Serial No. 488,779.

*To all whom it may concern:*

Be it known that ALEXANDER GRAHAM BELL, of Washington, District of Columbia, FREDERICK W. BALDWIN, of Toronto, Canada, now residing at Baddeck, in the Province of Nova Scotia, Canada, JOHN ALEXANDER DOUGLAS McCURDY, of Baddeck aforesaid, GLENN H. CURTISS, of Hammondsport, New York, and THOMAS E. SELFRIDGE, deceased, have invented a new and useful Improvement in Flying-Machines, which invention is fully set forth in the following specification.

This invention relates to flying machines, and more particularly to that class of flying machines ordinarily known as "aeroplanes" but which we prefer to call "aerodromes", and has for its object to produce a machine of this character which shall combine maximum strength and minimum weight; shall be readily steered; caused to rise or descend at the will of the operator, and shall possess means for maintaining its lateral balance or equilibrium, or for restoring said balance or equilibrium if the same becomes disturbed, and shall be capable of rising at the commencement of a flight without the use of any launching apparatus, platform or similar device. It has heretofore been proposed to construct machines of this character in which the supporting surfaces are made flexible and the marginal portions thereof are warped or flexed so that the different ends of the supporting surfaces on the opposite sides of the longitudinal medial line of the machine present different angles of incidence; that is, the marginal portion of the supporting surface on one side presents a greater angle of incidence than does the marginal portion on the opposite side of the machine, for the purpose of restoring the disturbed lateral balance or equilibrium of the machine as a whole. This is open to the objection that the side of the machine presenting the lesser angle of incidence will advance in the forward line of movement more rapidly than the side of the machine presenting the greater angle of incidence, thereby imparting a turning movement to the machine toward that side presenting the greater angle of incidence, and to overcome this and cause the machine to move in a straight line forward, it has been found necessary to employ a vertical steering rudder in combination with the flexible supporting surfaces. In contradistinction to this construction, the machine of the present invention is provided with rigid non-flexible supporting surfaces, and means distinct from the supporting surfaces themselves are provided, in combination with said rigid supporting surfaces, for causing the lower side of the machine to rise and the higher side of the machine to descend for the purpose of restoring the lateral balance thereof when the same has been disturbed.

Any suitable form of rigid non-flexible supporting surfaces may be employed, and there may be one or a plurality of such surfaces arranged in any desired relation to each other, the essential, however, being that the supporting surfaces shall be substantially rigid and shall not be constructed to be warped or flexed for the purpose of restoring the lateral balance of the structure when the same has become disturbed. Preferably, we employ a plurality, as two, rigid non-flexible supporting surfaces arranged one above the other, said surfaces being of a concavo-convex form with their concave sides toward each other so that their central portions are farther apart than their marginal portions, the two surfaces being composed of suitable frames covered with a proper fabric, preferably impervious to air, and the whole united into a strong, rigid, non-flexible truss-like structure by means of suitable struts or compression members and properly arranged guy-wires. While such concavo-convex rigid supporting surfaces are preferred, the same do not form an essential part of the present invention, since any rigid non-flexible supporting surface or supporting surfaces may be employed without departing from the limits of the invention.

Any suitable means distinct from the supporting surfaces themselves, and capable of acting in combination with said surfaces to cause the lower side of the machine to rise and the higher side of the machine to descend for restoring the lateral balance thereof when the same has been disturbed, may be employed. As here shown, said means consist of lateral balancing rudders located on opposite sides of the longitudinal medial line of the machine, and preferably near the lateral extremities of the supporting surfaces. These lateral balancing rudders form no part of the supporting surfaces and may be located between the rigid supporting surfaces or just beyond the marginal edges of the surfaces, or otherwise, as desired, suitable operating wires or other connections extending therefrom to an operating lever controlled by the aviator, and preferably arranged so as to be automatically operated by the movements of the aviator's body whenever the lateral balance of the machine is disturbed. While one of the main functions of these lateral rudders is that of balancing the machine or restoring the equilibrium when the same has become disturbed, they may also be employed for other purposes, since they may, if desired, be so manipulated as to assist in steering the machine, as well as contribute to an appreciable extent in causing the machine to rise or descend. It will be understood, therefore, that while these elements are herein referred to as "lateral balancing rudders" their function is not limited to the control of the equilibrium of the machine, but they are also capable of performing other functions.

The rigid non-flexible supporting surfaces united into a rigid structure and provided with the lateral balancing rudders above referred to, are mounted, according to the present invention, upon a suitable chassis or framework, preferably supported on wheels, one of which serves as a steering wheel to control the forward line of movement of the machine when it is on the ground. The machine is also provided with a suitable vertical steering rudder for giving direction to the line of flight when it is in the air, and preferably the steering wheel above mentioned and said vertical steering rudder are connected to a single operating mechanism, whereby the steering wheel and vertical rudder are simultaneously operated, to the end that the rudder may be placed in a proper position to continue the machine in the same direction when in the air that it has at the instant it leaves the ground.

There are various other specific features of improvement which will be described more in detail hereinafter and then pointed out in the claims.

The inventive idea involved in the machine of the present invention is capable of receiving a variety of mechanical expressions, one of which, for the purpose of illustrating the invention, is shown in the accompanying drawings; but it is to be expressly understood that said drawings and the particular construction shown therein and described in the specification are employed simply for the purpose of facilitating the description of the invention as a whole and not for the purpose of defining the limits of the invention, reference being had to the claims for this purpose.

Referring to the drawings, in which like reference numerals indicate like parts.

Figure 2:
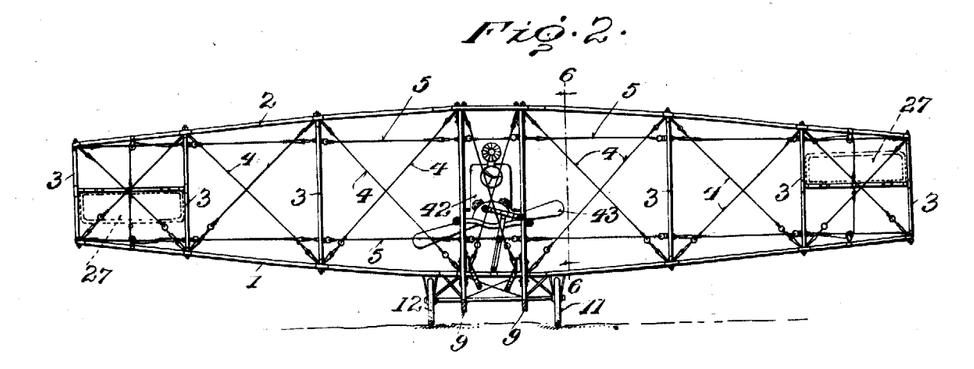
Fig. 2 is a front elevation of the machine with the forward steering rudder removed, and with the lateral balancing rudders placed between the lateral marginal portions of the rigid supporting surfaces.
Figure 3:
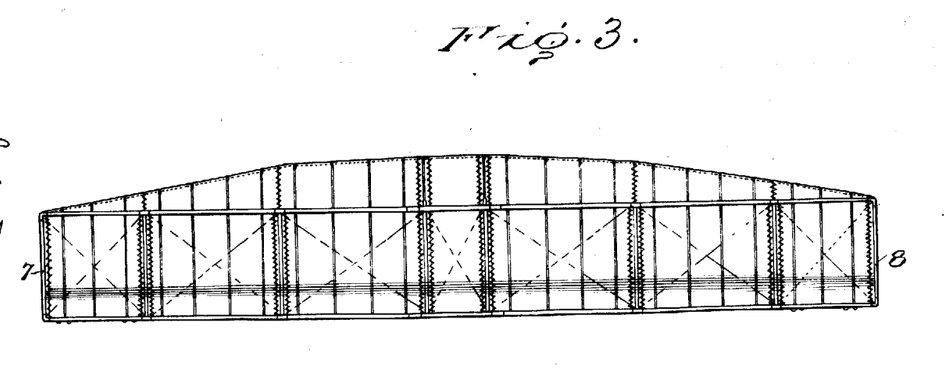
Fig. 3 is a plan view of one of the rigid non-flexible supporting surfaces.

In said drawings, 1, 2, indicate non-flexible concavo-convex supporting surfaces united into a rigid structure by means of suitable spacing struts 3, 3, and guy-wires 4, 4, and tension wires 5, 5, the said non-flexible supporting surfaces being united with their concave sides toward each other, as clearly shown in Fig. 2. As the particular construction of the rigid supporting surfaces and the specific manner of uniting the same form no essential part of the present invention, it only being essential that a rigid non-flexible structure should be employed, it will not be necessary to describe the same more fully and in detail. Fig. 3 is a plan of these rigid supporting surfaces, which are rigid and non-flexible clear out to the lateral marginal lines 7 and 8. The rigid non-flexible supporting surfaces thus superimposed one above the other and united together, are mounted on a suitable chassis or frame 9, Fig. 6, which frame is preferably supported on three wheels 10, 11 and 12, the forward wheel 10 being mounted in any suitable steering head 13, such as that of the ordinary bicycle or motorcycle construction, for example, which steering head is controlled by a steering lever 14, Fig. 6. Extending rearward from the central portion of the machine is a frame 15 preferably made of any light material, as bamboo, which at its rear supports a vertical rudder 16, and, if desired, a steadying tail-piece 17, the latter being in the form of a rectangular cell whose upper and lower surfaces are covered with a suitable fabric, the cell between said surfaces, however, being open from front to rear. The vertical rudder may be supported in any suitable position, but preferably, and as herein shown, is supported to the rear of the steadying tail-piece 17, and is mounted on vertical pivots and provided with means for turning it about said pivots. Said means, as here shown, are in the form of wires or cables 18, 18, extending from opposite sides of the vertical rudder to a steering wheel 19 secured to and mounted to turn on a shaft 20. This shaft is supported on a framework 21 extending forward from the front portion of the machine and supports the horizontal rudder 22, pivotally mounted at the forward end of the frame 21, so as to turn about a horizontal axis and provided with an operating lever 23, pivotally connected at 24, to the shaft 20 of the steering wheel 19, said shaft 20 being mounted in its bearings 25, 25, to slide longitudinally therein. By the turning movement of said wheel 19 the steering wires or cables 18 are controlled to operate the vertical steering rudder 16, and by sliding the rod 20 in its bearings 25, the lever 23 may be operated to adjust the horizontal steering rudder 22 to any angle desired. If placed at a positive angle of incidence it will have a tendency to lift the forward portion of the machine, and, therefore, to cause it to rise. If placed at a negative angle of incidence it will cause the machine to descend, and, if placed at a neutral angle, will act to hold the machine on any given horizontal course.

The operator sits grasping the wheel 19 and by pushing the wheel from him and thus sliding the rod or shaft 20 in its bearings he can operate the horizontal rudder 21 in one direction through the lever 23, and by pulling the wheel toward him and with it the shaft 20, he can operate the horizontal rudder in the opposite direction. It will be seen, therefore, that the aviator controls the vertical rudder which gives the line of direction and the horizontal rudder which determines the rise or descent of the machine through the single wheel 19. In addition to this, the wires or cables 18 leading to the vertical rudder 16 are also connected on either side to the wires 26, 26, (Fig. 7) attached to the steering lever 14 which controls the front steering wheel 10 on the chassis, so that at the same time that the steering wheel 19 is operated for adjusting the vertical steering rudder, it also operates, and to the same degree, the front steering wheel 10 on the chassis. It therefore follows that if the machine is controlled by the front steering wheel 10, so as to move in any given direction while on the ground, the vertical steering rudder 16 will be in the proper position to have the machine continue in the same line of flight when it rises from the ground; and vice versa, if the machine is in the air and the vertical rudder 16 is adjusted to direct it in any given line of flight, the front steering wheel 10 will be adjusted precisely the same, with the result that when the machine alights it will continue to move forward in the same direction in which it was moving in the air at the instant before it touched the ground.

Figure 5:
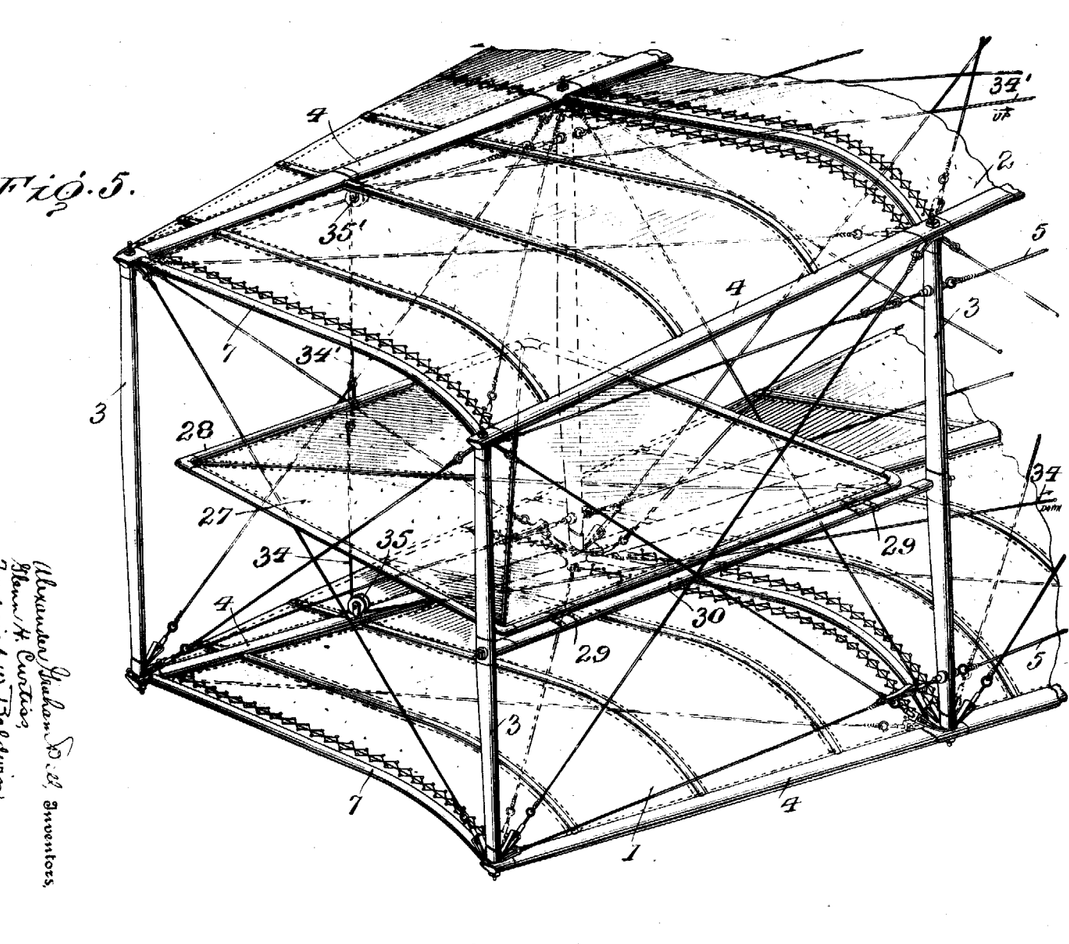
Fig. 5 is a like view showing the manner of mounting the lateral balancing rudders between the supporting surfaces.

One of the most important features of the present invention is that provided for restoring the lateral equilibrium of the machine when, for any reason, the same has become disturbed. In the present invention this is accomplished by providing a plurality of lateral balancing rudders placed on opposite sides of the longitudinal medial line of the machine. In some forms of the invention there are two such rudders, one on each side of the longitudinal medial line, which rudders are preferably of equal area and are mounted to turn on normally horizontal axes extending by preference parallel with the front line of the machine. These lateral balancing rudders may be placed in any suitable position with respect to the supporting surfaces 1 and 2, and have as one of their main functions the maintenance or restoration of the lateral equilibrium, since they are entirely distinct from and do not in any sense constitute a part of the supporting surface of the machine. Said rudders may be placed above the supporting surfaces or below them, or otherwise. As shown in Figs. 2 and 5, they are placed between the supporting surfaces. In said figures, 27 indicates the lateral balancing rudders, which consist of a suitable framework 28 covered by a proper fabric and pivoted at its forward margin at 29, 29, to a part of the framework of the machine, here shown in the form of a horizontal bar 30 extending between two of the forward series of struts 3, 3. It will be understood that there are at least two of these balancing rudders 27, one on each side of the longitudinal medial line of the machine, as shown in Fig. 2, and that normally when the machine is in a state of lateral equilibrium, these balancing rudders are maintained horizontal to, that is, within the plane of the line of flight of the machine, and, since the pressure of the air above and below said lateral rudders is the same (owing to the fact that normally said rudders incline to neither a positive nor a negative angle of incidence) they constitute no part of the supporting surface of the machine as a whole. When, however, the lateral equilibrium of the machine has become disturbed that rudder on the lower side of the machine is inclined to a positive angle and that rudder on the higher side of the machine is inclined to a negative angle of incidence, so that the one tends to lift the lower side of the machine and the other to depress the higher side of the machine, thereby acting to again bring the machine into a state of lateral equilibrium or on an even keel. Even when so operated these rudders do not constitute a part of the supporting surface of the machine, since the rudders are of the same area and one being inclined at a negative and the other to an equal but positive angle of incidence, the lifting action of one is neutralized by the depressing action of the other.

Figure 1:
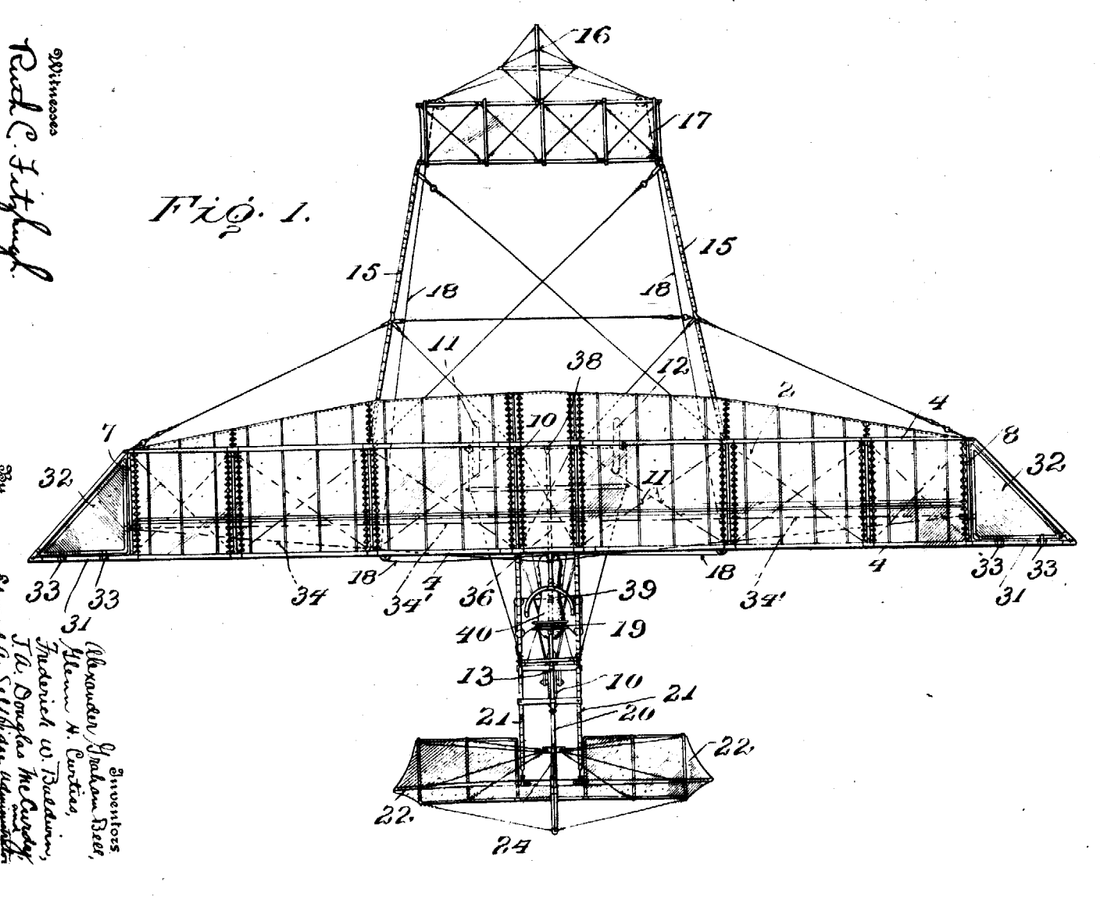
—Figure 1 is a top plan view of one form of the machine with the lateral balancing rudders placed outside of the lateral marginal lines of the rigid supporting surfaces.

In the construction just described but two lateral balancing rudders are employed. If preferred, however, more than two may be employed, as, for example, four such rudders may be used and may be mounted in any suitable manner, preferably beyond or outside of the lateral marginal lines of the supporting surfaces. For the purpose of thus mounting these lateral balancing rudders outside of or beyond the lateral marginal lines of the supporting surfaces, the forward members of the frame of each supporting surface are extended outward beyond said lateral marginal lines, as shown at 31, 31 (Fig. 4), and to these extensions the lateral balancing rudders 32, 32 (here shown as triangular in form) are pivoted as at 33, 33. Preferably and as here shown, there are two pairs of these lateral balancing rudders, one pair on each side of the machine, each of the rudders being mounted to turn on horizontal axes outside of the lateral marginal lines of the supporting surfaces. Like the rudders 27 shown in Figs. 2 and 5, these rudders normally lie in a horizontal plane, that is, they are inclined neither at a positive nor a negative angle of incidence, and, hence, do not constitute any part of the supporting surfaces of the machine. If, however, the lateral equilibrium of the machine is disturbed, that pair of rudders on the lower side of the machine is inclined at a positive angle of incidence and that pair on the higher side of the machine is inclined at a negative angle of incidence precisely as described in connection with the lateral balancing rudders 27, 27, shown in Figs. 2 and 5; and, since the area of the balancing rudders on one side of the machine is the same as the area on the opposite side of the machine, and since each pair of rudders is inclined (for the purpose of restoring equilibrium) at the same angle of incidence, (the one, however, being positive and the other negative,) the lifting effect of those rudders inclined at the positive angle of incidence is neutralized by the depressing effect of the other pair of rudders inclined at a negative angle of incidence, so that the lifting effect of the two pairs of rudders combined, is zero. It will thus be seen that whatever may be the form or the position of the lateral balancing rudders employed, they perform the function of restoring the lateral equilibrium of the machine, and that they do not constitute any part of the supporting surface. For the purpose of controlling these lateral balancing rudders, whether the same are mounted between the supporting surfaces or beyond the lateral margins of said supporting surfaces, or otherwise, suitable operating wires or cables 34, 34, are secured to said rudders and are led through suitable pulleys 35, 35, (Figs. 4 and 5) to a lever 36 (Fig. 1) pivoted at its rear end 38 to any suitable part of the machine, as, for example, one of the rear members of the framework. This lever is provided with any suitable means whereby the aviator may shift the same on its pivot or fulcrum 38. Preferably, and as here shown, the lever is provided with forwardly extending arms 39, which together constitute approximately a semi-circle and are so positioned that when the aviator is sitting on the seat 40 they embrace his body below his arms. When the lateral equilibrium of the machine is disturbed and one side, for example the right hand side of Fig. 1, is depressed, and the other side, as the left hand side of Fig. 1, is raised, the instinctive movement of the aviator will cause him to lean toward the higher side, that is, toward the left hand side of Fig. 1, and he will, therefore, shift the lever 36 from right to left in Fig. 1. This shifting of the lever acts to effect a pull on the rudder controlling wire or cable 34 leading to the balancing rudder on the lower side of the machine, thereby drawing the rear portion of the rudder downward and inclining the rudder at a positive angle of incidence; and at the same time said movement of the lever operates to produce a slack in the wire or cable 34 leading to the balancing rudder on the higher side of the machine so that it may be moved upward at its rear portion, thus inclining it at a negative angle of incidence. Referring to Fig. 5, there is a controlling wire or cable 34' attached to the rear portion of the rudder 27 and extending through suitable guy-pulleys 35' to the upper side of the balancing rudder on the opposite side of the machine, so that when the controlling lever 36 is operated to incline the rudder on the lower side of the machine to a positive angle, a pull is effected on the wire or cable 34' which operates to incline the balancing rudder on the opposite or upper side of the machine to a corresponding negative angle.

Figure 4:
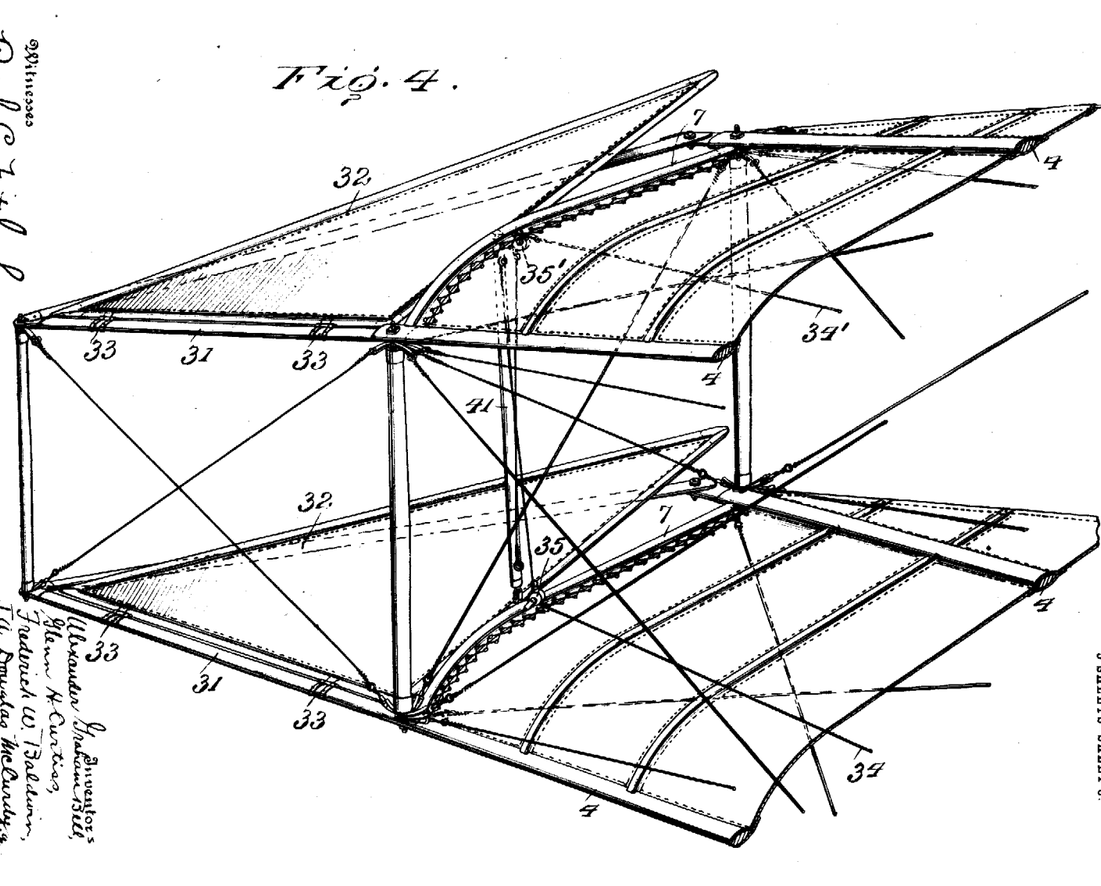
Fig. 4 is a perspective detail showing the manner of mounting the lateral balancing rudders beyond the lateral marginal lines of the rigid supporting surfaces.

Referring to Fig. 4, the wire or cable 34' extending from the balancing rudders on one side to the balancing rudders on the opposite side of the machine, as well as the cables 34 extending directly to the lever 36, are preferably attached respectively to the bottom and top portions of a strut 41 extending between the two rudders 32, 32, as shown in Fig. 4, so that a pull on the cable or wire 34' and a corresponding slack on the cable 34 operates to set the rudders 32, 32, at a negative angle of incidence, whereas a pull on the wire or cable 34, and a corresponding slack on the wire or cable 34' operates to move the rudders in the reverse direction.

While it is deemed preferable, when the balancing rudders are employed solely for maintaining or restoring the equilibrium of the machine, to so connect them that they are simultaneously operated in reverse directions, it will, of course, be understood that this is not at all necessary, since each rudder or each set of rudders on the opposite sides of the medial line of the machine may each be provided with an operating lever or mechanism entirely independent of the operating lever or mechanism connected to the rudder or rudders on the other side, so that the rudders on opposite sides of the medial line of the machine may be independently operated. When this is done these lateral rudders could be employed not only for maintaining or restoring the equilibrium of the machine, but might be used in place of the forward or elevating and depressing rudder to cause the machine to rise or descend. This can be accomplished by simply setting the two rudders or sets of rudders at the same angle of incidence, placing them both at a positive angle to cause the machine to rise and a negative angle to cause them to descend. Moreover, if the two lateral rudders or two sets of lateral rudders are thus independently operable they can be used in place of or in addition to the vertical steering rudder for steering the machine. It will be apparent if the rudder or rudders on one side of the machine are placed at an angle of incidence whether positive or negative to the line of flight while the rudders on the other side remain neutral, the machine will turn to that side on which the rudder is placed at an angle of incidence.

In view of the foregoing it is to be distinctly understood that the invention is not limited to the employement of lateral rudders for maintaining or restoring the equilibrium, since said rudders are claimed herein as constituting a part of this invention for whatever use they may be employed.

Any suitable means may be employed for propelling the machine, and, as here shown, such means consist of a motor 42, mounted in the middle portion of the machine and suitably geared to a proper shaft for driving a single propeller 43, at the rear of the machine, but, as the specific construction of motor and mounting of the propeller form no part of the present invention, it will be unnecessary to describe the same more in detail.

Figures 6, 7:
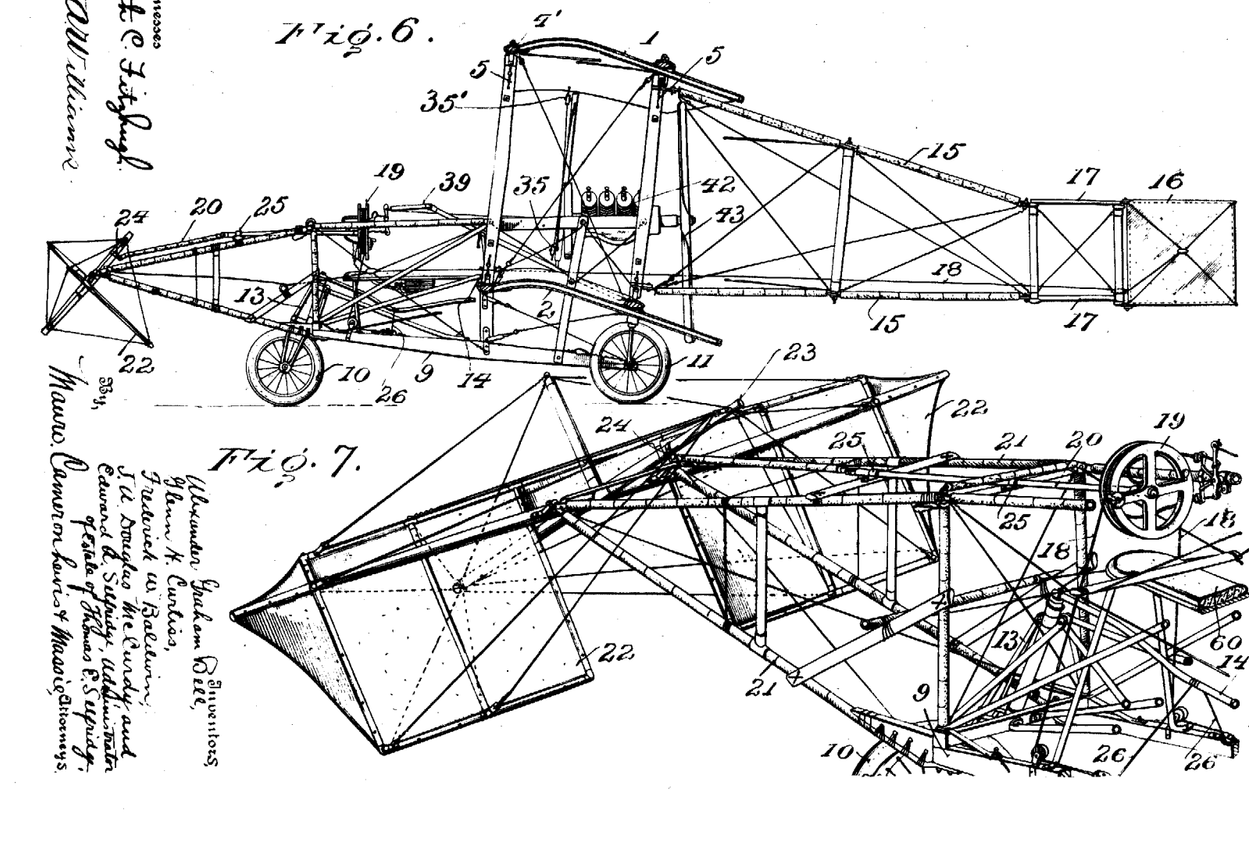
Fig. 6 is a vertical section on the line 6—6 of Fig. 2, looking in the direction of the arrows.
Fig. 7 is a perspective of the forward or horizontal rudder and its supporting frame and operating mechanism.

To launch the machine at the beginning of a flight, the same is placed upon the ground, as shown in Fig. 6. The aviator takes his position on the seat 40 (Fig. 1), with the fork 39 embracing his body, and his hands grasping the wheel 19, and the horizontal forward rudder in substantially a horizontal plane. The engine being started, the machine is driven along the ground, and is controlled by the aviator through the wheel 19 and the forward steering wheel 10 on the chassis. When the machine has reached the desired speed on the ground, the aviator pulls the steering wheel 19 toward him and thus inclines the horizontal steering rudder to a positive angle of incidence, as, for example, that shown in Fig. 6, thereby elevating the forward portion of the machine slightly and inclining the supporting surfaces 1 and 2 at a positive angle of incidence, and thus causing the machine to rise from the ground. At the instant when this occurs, the steering rudder 16 will be set in exactly the same vertical plane as the steering wheel 10, thereby causing the machine to continue in the same forward line of flight as its forward line of movement while on the ground.

It will be understood that the structure thus hereinbefore specifically described may be varied in a great number of details, and that certain features thereof may be used in the absence of others without departing from the spirit of the invention, and such changes in detail of construction, and such uses of some of the features in the absence of others, are intended to be within the scope of the claims hereto appended.

What we claim is:—

1. In a flying machine, the combination of a supporting surface having a positive angle of incidence, a pair of lateral balancing rudders, one on each side of the medial fore and aft line of the structure and each of said rudders normally having a zero angle of incidence and connections between said rudders.

2. In a flying machine, the combination of a supporting surface having a positive angle of incidence, a pair of lateral balancing rudders, one on each side of the medial fore and aft line of the structure, and each of said rudders normally having a zero angle of incidence, and connections between said rudders whereby one is adjusted to a positive and the other to a negative angle of incidence.

3. In a flying machine, the combination of a supporting surface having a positive angle of incidence, a pair of lateral balancing rudders, one on each side of the medial fore and aft line of the structure, and each of said rudders normally having a zero angle of incidence, and means for simultaneously adjusting said rudders, the one to a positive and the other to a negative angle of incidence.

4. In a flying machine, the combination of a pair of suitably spaced supporting surfaces having a positive angle of incidence, means uniting said supporting surfaces, and a pair of horizontal balancing rudders normally having a zero angle of incidence and arranged one on each side of the medial fore and aft line of the structure and connections between said rudders.

5. In a flying machine, the combination of a pair of suitably spaced supporting surfaces having a positive angle of incidence, means uniting said supporting surfaces, a pair of horizontal balancing rudders normally having a zero angle of incidence and arranged one on each side of the medial fore and aft line of the structure, and connections between said rudders whereby one is adjusted to a positive and the other to a negative angle of incidence.

6. In a flying machine, the combination of a supporting surface having a positive angle of incidence, a pair of lateral balancing rudders, one arranged on either side of the medial fore and aft line of the machine, means normally supporting said lateral balancing rudders at a zero angle of incidence, and means operating to shift said balancing rudders to equal and opposite angles of incidence.

7. In a flying machine, the combination of a supporting surface having a positive angle of incidence, a pair of lateral balancing rudders, one arranged on either side of the medial fore and aft line of the machine, means normally supporting said lateral balancing rudders at a zero angle of incidence, and means operating to simultaneously shift said balancing rudders to equal and opposite angles of incidence.

8. In a flying machine, the combination of a supporting surface having a positive angle of incidence, a pair of lateral balancing rudders, one arranged on either side of the medial fore and aft line of the machine, connections between said balancing rudders, means normally supporting said lateral rudders at a zero angle of incidence, and means operating to shift said balancing rudders to equal and opposite angles of incidence.

9. In a flying machine, the combination of a plurality of supporting surfaces having a positive angle of incidence, means uniting said supporting surfaces, and a pair of horizontal balancing rudders, one on each side of the medial fore and aft line of the structure and each mounted outside of the lateral marginal extremities of said supporting surfaces and having normally a zero angle of incidence.

10. In a flying machine, the combination of a pair of suitably spaced supporting surfaces having a positive angle of incidence, means uniting said supporting surfaces, and a pair of horizontal balancing rudders normally having a zero angle of incidence, one on each side of the medial fore and aft line of the structure, and each of said rudders being mounted outside of the lateral marginal lines of said supporting surfaces and on an axis transverse to the line of flight.

11. In a flying machine, the combination of a pair of suitably spaced supporting surfaces having a positive angle of incidence, means uniting said supporting surfaces, a lateral balancing rudder normally having a zero angle of incidence and mounted on an axis transverse to the line of flight on each side of the medial fore and aft line of the structure, and means inclining the said rudder on one side of the structure at a positive angle of incidence and the rudder on the opposite side of the structure at a negative angle of incidence.

12. In a flying machine, the combination of a plurality of suitably spaced supporting surfaces having a positive angle of incidence, means uniting said supporting surfaces, a pair of lateral balancing rudders, one on each side of the medial fore and aft line of the structure, and each of said rudders normally having a zero angle of incidence, and a single controlling lever operatively connected to both of said rudders.

13. In a flying machine, the combination of a plurality of suitably spaced supporting surfaces having a positive angle of incidence, means uniting said supporting surfaces, a pair of lateral balancing rudders, one on each side of the medial fore and aft line of the structure and outside of the marginal extremities of said supporting surfaces and each of said rudders normally having a zero angle of incidence, and a single controlling lever operatively connected to both of said rudders.

14. In a flying machine, the combination of a plurality of suitably spaced supporting surfaces having a positive angle of incidence, means uniting said supporting surfaces, a pair of lateral balancing rudders, one on each side of the medial fore and aft line of the structure and each of said rudders normally having a zero angle of incidence, and a single controlling lever operatively connected to both of said rudders and having a part in operative relation with the person of the aviator.

15. In a flying machine, the combination of a plurality of suitably spaced supporting surfaces having a positive angle of incidence, means uniting said supporting surfaces, a pair of lateral balancing rudders, one on each side of the medial fore and aft line of the structure and outside of the marginal extremities of said supporting surfaces and each of said rudders normally having a zero angle of incidence, and a single controlling lever operatively connected to both of said rudders and having a part in operative relation with the person of the aviator.

16. In a flying machine, the combination of a plurality of suitably spaced supporting surfaces having a positive angle of incidence, means uniting said supporting surfaces, a pair of lateral balancing rudders, one on each side of the medial fore and aft line of the structure and each of said rudders normally having a zero angle of incidence, and a controlling lever operatively connected to both of said rudders and having a part embracing the body of the aviator.

17. In a flying machine, the combination of a plurality of suitably spaced supporting surfaces having a positive angle of incidence, means uniting said supporting surfaces, a pair of lateral balancing rudders, one on each side of the medial fore and aft line of the structure and outside of the marginal extremities of said supporting surfaces, and each of said rudders normally having a zero angle of incidence, and a controlling lever operatively connected to both of said rudders and having a part embracing the body of the aviator.

18. In a flying machine, the combination of a plurality of suitably spaced supporting surfaces having a positive angle of incidence, a member projecting outside of the lateral marginal line of said surfaces, a rudder fulcrumed to each of said projecting members and normally having a zero angle of incidence, and means for operating said rudders.

19. In a flying machine, the combination of a pair of superposed supporting surfaces having a positive angle of incidence, means uniting said supporting surfaces into a rigid non-flexing structure, a pair of lateral balancing rudders normally having a zero angle of incidence and one on each side of the medial fore and aft line of the structure, means connecting said rudders together whereby a movement of one imparts a reverse movement to the other, and operating means connected to both of said rudders.

20. In a flying machine, the combination of a pair of superposed supporting surfaces having a positive angle of incidence, means uniting said supporting surfaces into a rigid non-flexing structure, a pair of lateral balancing rudders normally having a zero angle of incidence, one on each side of the medial fore and aft line of the structure and outside of the marginal extremities of said supporting surfaces, means connecting said rudders together whereby a movement of one imparts a reverse movement to the other, and operating means connected to both of said rudders.

21. In a flying machine, the combination of a pair of suitably spaced supporting surfaces having a positive angle of incidence and means uniting the same, a pair of lateral balancing rudders normally having a zero angle of incidence, one on each side of the medial fore and aft line of the structure, means for operating said lateral rudders, an elevating and depressing device, and means for operating said device.

22. In a flying machine, the combination of a supporting surface, a pair of lateral balancing rudders, one on each side of the medial fore and aft line of the structure, an elevating and depressing device, a steering rudder, a shaft mounted to move longitudinally and operatively connected to said elevating and depressing device, a member mounted on said shaft and connected to said steering rudder, and means for operating said balancing rudders.

23. In a flying machine, the combination of a chassis mounted on wheels one of which is a steering wheel, an aerodrome mounted on said chassis, a steering rudder, an elevating and depressing device, a longitudinally movable shaft, a steering element mounted on said shaft and means operatively connecting said element to said steering rudder and steering wheel, and operative connections between said shaft and said elevating and depressing device.

24. In a flying machine, the combination of an aerodrome having a positive angle of incidence and two lateral balancing rudders normally having a zero angle of incidence, one on each side of the medial fore and aft line of the machine and pivotally supported on the outside of the lateral marginal lines thereof, and means automatically operated by the body movements of the aviator and operatively connected to said balancing rudders.

25. In a flying machine, the combination of a pair of superposed supporting surfaces having a positive angle of incidence, means uniting said supporting surfaces into a rigid non-flexing structure, a lateral balancing rudder normally having a zero angle of incidence on each side of the medial fore and aft line of the structure and mounted to turn on an axis substantially parallel to the longitudinal axis of the machine, and means connecting said rudders whereby a movement of one imparts a reverse movement to the other, and operating means connected to both of said rudders.

26. In a flying machine, the combination of a plurality of suitably spaced supporting surfaces having a positive angle of incidence, a member projecting outside of the lateral marginal extremities of each of said surfaces and in line with the front marginal edge thereof, a rudder fulcrumed to each of said projecting members, and means for operating said rudders.

27. In a flying machine, the combination of a plurality of suitably spaced supporting surfaces having a positive angle of incidence, means uniting said supporting surfaces, a pair of lateral balancing rudders, one on each side of the medial fore and aft line of the structure, and each of said rudders normally having a zero angle of incidence, and connections between said rudders whereby one is adjusted to a positive and the other to a negative angle of incidence.

28. In a flying machine, the combination of a plurality of suitably spaced supporting surfaces having a positive angle of incidence, means uniting said supporting surfaces, a pair of lateral balancing rudders, one on each side of the medial fore and aft line of the structure, and each of said rudders normally having a zero angle of incidence, and means for simultaneously adjusting said rudders the one to a positive and the other to a negative angle of incidence.

In testimony whereof we have signed this specification in the presence of two subscribing witnesses.

ALEXANDER GRAHAM BELL.
FREDERICK W. BALDWIN.
J. A. DOUGLAS McCURDY.
GLENN H. CURTISS.
EDWARD A. SELFRIDGE,
*Administrator of the estate of Thomas E. Selfridge, deceased.*

Witnesses as to the signatures of Alexander Graham Bell, Frederick W. Baldwin, and J. A. Douglas McCurdy:
CHARLES R. COX
EDW. GEOFF. STAIRS.

Witnesses as to the signature of Glenn H. Curtiss:
L. G. HORTON,
F. D. STELLER.

Witnesses as to the signature of Edward A. Selfridge:
E. A. SELFRIDGE, Jr.,
ALEXANDER F. McMORE.